US008964786B2

(12) United States Patent
Vijayasankar et al.

(10) Patent No.: US 8,964,786 B2
(45) Date of Patent: Feb. 24, 2015

(54) COMMUNICATIONS IN BEACON-ENABLED NETWORKS

(75) Inventors: Kumaran Vijayasankar, Dallas, TX (US); Shu Du, San Jose, CA (US); Anand Dabak, Plano, TX (US); Badri Varadarajan, Mountain View, CA (US); Il Han Kim, Dallas, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 150 days.

(21) Appl. No.: 13/435,862

(22) Filed: Mar. 30, 2012

(65) Prior Publication Data
US 2012/0257639 A1 Oct. 11, 2012

Related U.S. Application Data

(60) Provisional application No. 61/473,262, filed on Apr. 8, 2011.

(51) Int. Cl.
*H04J 4/00* (2006.01)
*H04B 3/54* (2006.01)
*H04L 5/00* (2006.01)

(52) U.S. Cl.
CPC .............. *H04B 3/542* (2013.01); *H04L 5/0007* (2013.01); *H04L 5/0053* (2013.01)
USPC ............................ 370/478; 370/498; 370/350

(58) Field of Classification Search
CPC .... H04B 3/542; H04B 5/0007; H04B 5/0053; H04B 5/0091
USPC ........... 370/338, 328, 350, 447, 203; 375/258
See application file for complete search history.

(56) References Cited

U.S. PATENT DOCUMENTS

| | | | |
|---|---|---|---|
| 7,298,691 B1 * | 11/2007 | Yonge et al. | 370/203 |
| 8,130,783 B2 * | 3/2012 | Lee et al. | 370/445 |
| 8,483,741 B1 * | 7/2013 | Hussain et al. | 455/522 |
| 2003/0169155 A1 | 9/2003 | Mollenkopf et al. | |
| 2005/0185669 A1 * | 8/2005 | Welborn et al. | 370/465 |
| 2006/0050730 A1 * | 3/2006 | Shvodian | 370/458 |
| 2007/0025386 A1 * | 2/2007 | Riedel et al. | 370/445 |
| 2007/0064742 A1 * | 3/2007 | Shvodian | 370/503 |
| 2007/0091925 A1 * | 4/2007 | Miyazaki et al. | 370/469 |
| 2007/0218921 A1 * | 9/2007 | Lee et al. | 455/456.1 |
| 2007/0230497 A1 | 10/2007 | Choi et al. | |
| 2008/0075109 A1 * | 3/2008 | Zangi | 370/458 |
| 2008/0232345 A1 * | 9/2008 | Espina et al. | 370/350 |

(Continued)

*Primary Examiner* — Asad Nawaz
*Assistant Examiner* — Parth Patel
(74) *Attorney, Agent, or Firm* — Steven A. Shaw; Frederick J. Telecky, Jr.

(57) ABSTRACT

Systems and methods for designing, using, and/or implementing communications in beacon-enabled networks are described. In various implementations, these systems and methods may be applicable to power line communications (PLC). For example, a method may include identifying one of a plurality of orthogonal superframes. The identified superframe may include beacon slots and contention access period (CAP) slots. The beacon slots may follow a sequence of two or more frequency subbands, and the CAP slots may follow the same sequence of two or more frequency subbands. Also, the sequence of two or more frequency subbands may be distinct from other sequences of two or more frequency subbands followed by other beacon slots and CAP slots within others of the plurality of available superframes. The method may then include communicating with another device using the identified superframe.

10 Claims, 10 Drawing Sheets

(56) References Cited

U.S. PATENT DOCUMENTS

| | | | |
|---|---|---|---|
| 2008/0274689 A1* | 11/2008 | Kuban | 455/7 |
| 2009/0067389 A1 | 3/2009 | Lee et al. | |
| 2009/0103501 A1* | 4/2009 | Farrag et al. | 370/337 |
| 2009/0240449 A1 | 9/2009 | Gibala et al. | |
| 2009/0245195 A1* | 10/2009 | Bhattad et al. | 370/329 |
| 2009/0310692 A1* | 12/2009 | Kafle et al. | 375/260 |
| 2010/0034159 A1* | 2/2010 | Shin et al. | 370/329 |
| 2010/0110981 A1* | 5/2010 | Shao et al. | 370/328 |
| 2010/0226391 A1* | 9/2010 | Miyazaki et al. | 370/468 |
| 2010/0278062 A1* | 11/2010 | Abraham et al. | 370/252 |
| 2011/0090880 A1* | 4/2011 | Abraham et al. | 370/338 |
| 2011/0150042 A1* | 6/2011 | Liu | 375/133 |
| 2011/0255557 A1* | 10/2011 | Varadarajan et al. | 370/474 |
| 2011/0267177 A1 | 11/2011 | Kim et al. | |
| 2011/0267956 A1* | 11/2011 | Yonge et al. | 370/241 |
| 2012/0093517 A1* | 4/2012 | Rajagopal et al. | 398/130 |
| 2012/0236876 A1* | 9/2012 | Vijayasankar et al. | 370/461 |

* cited by examiner

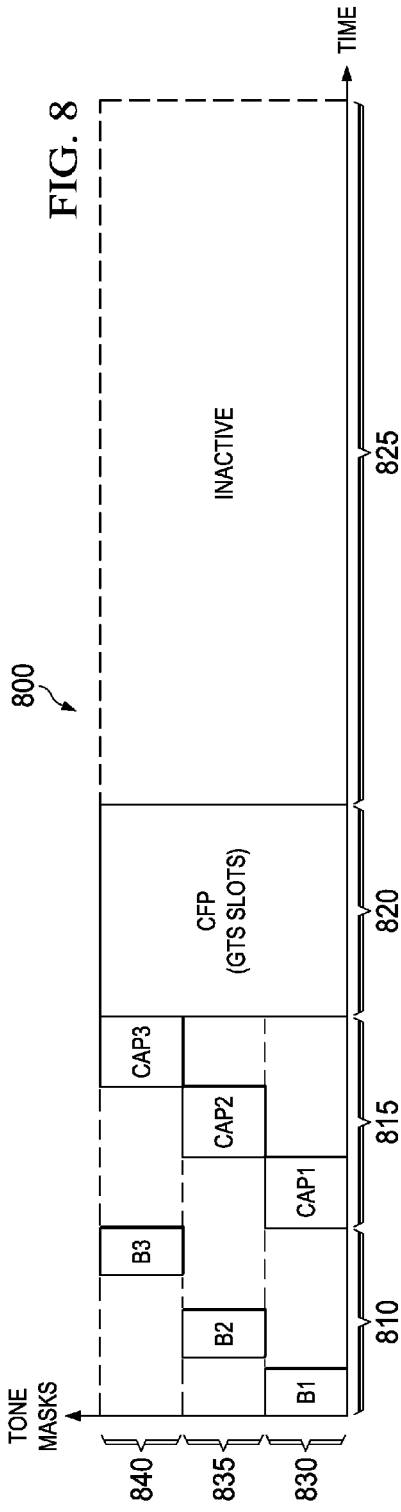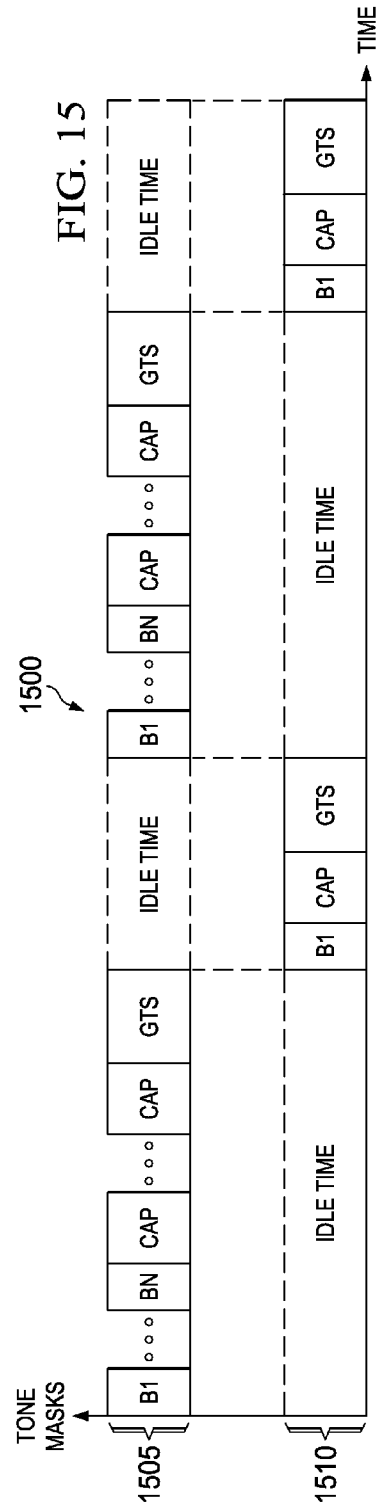

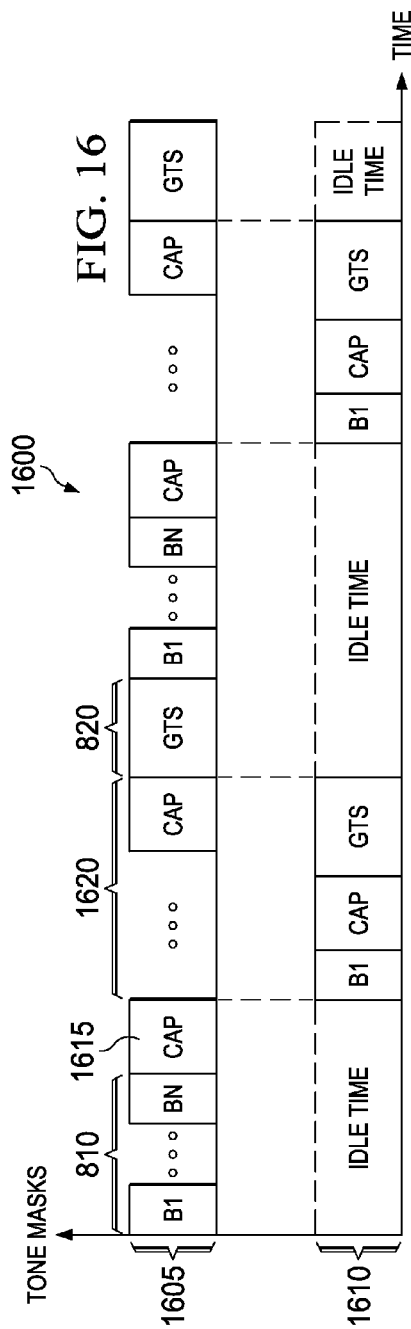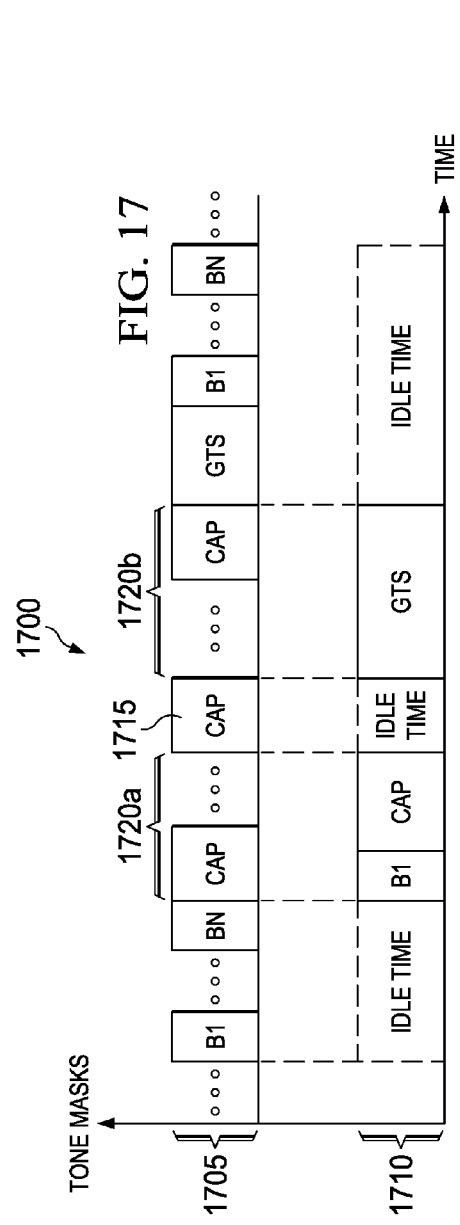

COMMUNICATIONS IN BEACON-ENABLED NETWORKS

CROSS-REFERENCE TO RELATED APPLICATION

This application claims the benefit of the filing date of U.S. Provisional Patent Application No. 61/473,262 titled "Operation of MV-LV and LV-LV Communications in Beacon Enabled PLC Networks" and filed Apr. 8, 2011, the disclosure of which is hereby incorporated by reference herein in its entirety.

TECHNICAL FIELD

This specification is directed, in general, to network communications, and, more specifically, to systems and methods for designing, using, and/or implementing communications in beacon-enabled networks.

BACKGROUND

There are several different types of network communications available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing communications in beacon-enabled networks are described. In an illustrative, non-limiting embodiment, a method may include identifying one of a plurality of orthogonal superframes, the identified superframe including beacon slots and contention access period (CAP) slots, the beacon slots following a sequence of two or more frequency subbands and the CAP slots following the same sequence of two or more frequency subbands, the sequence of two or more frequency subbands being distinct (e.g., orthogonal) from other sequences of two or more frequency subbands followed by other beacon slots and CAP slots within others of the plurality of orthogonal superframes. The method may then include communicating with another device using the identified superframe.

In various implementations, the beacon slots may precede the CAP slots in time within the identified superframe. The identified superframe may also includes a contention free period (CFP) slot, the CFP slot occupying all subbands of the sequence of two or more frequency subbands, the CAP slots preceding the CFP slot in time within the identified superframe. The identified superframe further includes an inactivity period, the CFP slot preceding the inactivity period in time. Also, in some cases, a portion of a given one of the CAP slots in the identified superframe partially overlaps in time with another CAP slot of another one of the plurality of orthogonal superframes.

In some embodiments, identifying the one of the plurality of orthogonal superframes may include transmitting a message to a neighboring device and receiving, from the neighboring device, a response to the transmission, the response including an identification of a superframe in use by the neighboring device. The method may then include identifying one of the plurality of orthogonal superframes that is different from the superframe in use by the neighboring device. Moreover, such a method may be performed, for example, by a power line communications (PLC) data concentrator coupled to a medium-voltage (MV) power line, and the neighboring device may be another PLC data concentrator coupled to the MV power line.

In other embodiments, identifying the one of the plurality of orthogonal superframes may include transmitting an association request to a coordinating device and receiving, from the coordinating device, a response to the transmission, the response including an identification of a selected one of the plurality of orthogonal superframes. Such a method may be performed, for example, by a PLC data concentrator coupled to an MV power line, and the coordinating device may be another PLC data concentrator coupled to the MV power line. In some cases, at least one of the CAP slots of the selected superframe may use a same frequency subband as a CAP slot of a different superframe used by the coordinating device at the same time.

In another illustrative, non-limiting embodiment, a system may include a PLC device coupled to a low-voltage (LV) power line, the LV power line coupled to an MV power line through a transformer, the PLC device comprising a processor and a memory coupled to the processor. The memory may be configured to store program instructions executable by the processor to cause the PLC device to conduct a first communication with a PLC data concentrator coupled to the MV power line following a superframe, the superframe including a plurality of beacon slots, a plurality of CAP slots, and a GTS, each of the plurality of CAP slots occupying a different one of the plurality of frequency subbands, the first communication configured to take place during at least one of: a selected one of the plurality of CAP slots or the GTS. The memory may also be configured to store program instructions executable by the processor to cause the PLC device to conduct a second communication with another PLC device coupled to the LV power line, the second communication configured to take place without interfering with the first communication.

In some implementations, the second communication may be separated from the first communication in time, and the PLC device may instruct the other PLC device not to transmit messages during the plurality of beacon slots, the plurality of CAP slots, and the GTS and/or it may instruct the other PLC device to transmit messages during an idle period, the idle period following the GTS. In other implementations, the second communication may be separated from the first communication in frequency, the second communication following another superframe, the other superframe being active concurrently with one or more of the plurality of CAP slots other than the selected one of the plurality of CAP slots. Additionally or alternatively, the second communication may be configured to take place in non-beacon mode using a carrier sense technique.

In yet another illustrative, non-limiting embodiment, an electronic storage medium may have program instructions stored thereon that, upon execution by a processor within a PLC device, cause the PLC device to store a first superframe having a first set of beacon slots and a first set of CAP slots, each slot of the first set of beacon slots following a first sequence of frequency subbands and each slot of the first set of CAP slots following the first sequence of frequency subbands. The PLC device may also store a second superframe having a second set of beacon slots and a second set of CAP slots, each slot of the second set of beacon slots following a second sequence of frequency subbands and each slot of the second set of CAP slots following the second sequence of frequency subbands. Moreover the second sequence of frequency subbands may be orthogonal with respect to the first sequence of frequency subbands.

The program instructions may then cause the PLC device to select the first or second superframe, and to communicate with another PLC device using the selected superframe. For example, the PLC device may be a PLC data concentrator coupled to a medium-voltage (MV) power line, and the other PLC device may be coupled to an LV power line or an MV power line.

In some implementations, to select the first or second superframe, the program instructions may cause the PLC device to transmit a message to a neighboring PLC device, receive, from the neighboring PLC device, a response to the transmission, the response indicating that the first superframe is in use by the neighboring PLC device, selecting the second superframe to communicate with the other PLC device. Additionally or alternatively, the PLC device may transmit an association request to a coordinating PLC device, receive, from the coordinating PLC device, a response to the association request, the response including an identification of the first or second superframe, and select the identified superframe to communicate with the other PLC device.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a device or modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
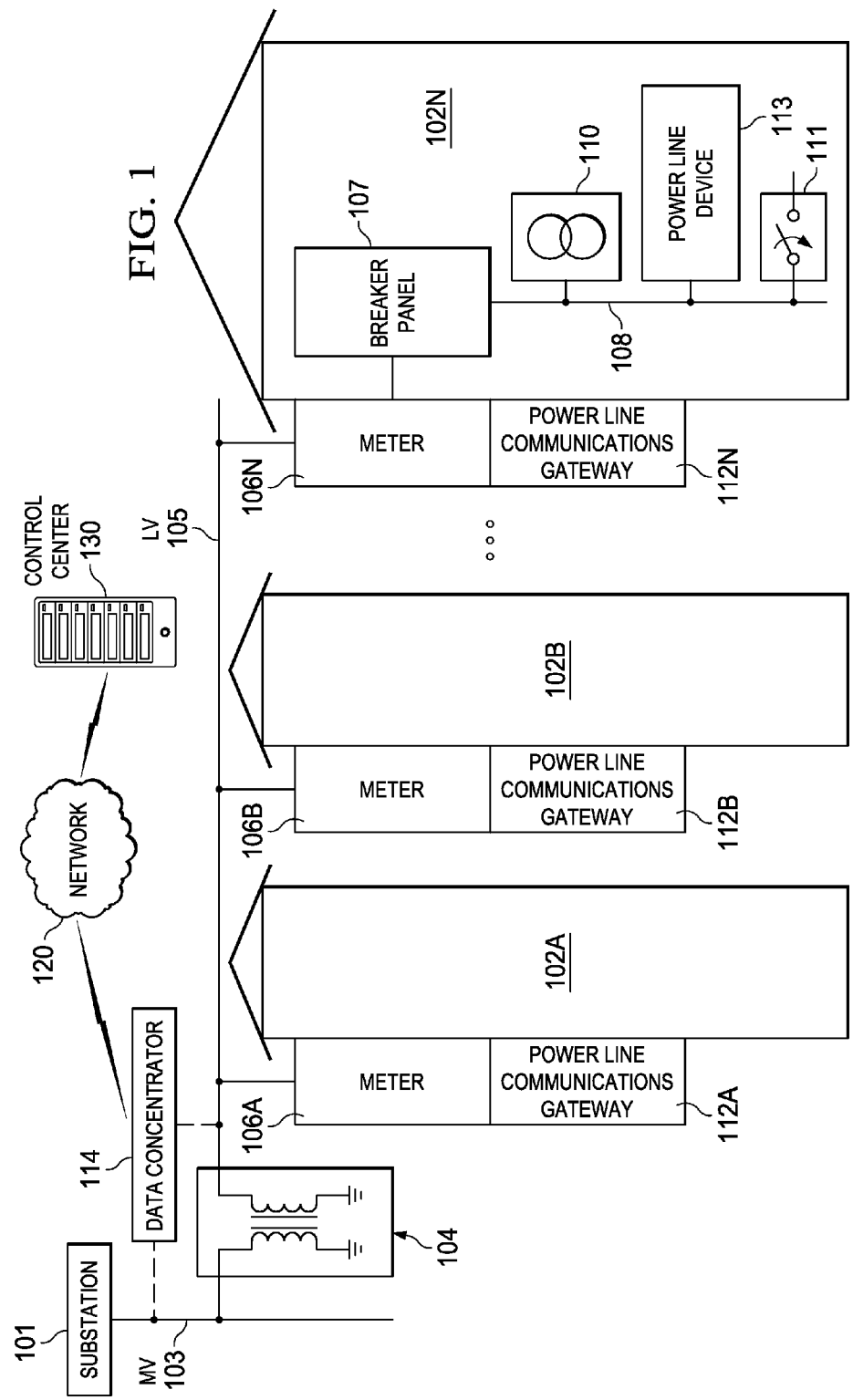

Having thus described the invention(s) in general terms, reference will now be made to the accompanying drawings, wherein:

FIG. 1 is a block diagram of a power line communication (PLC) environment according to some embodiments.

Figure 2:
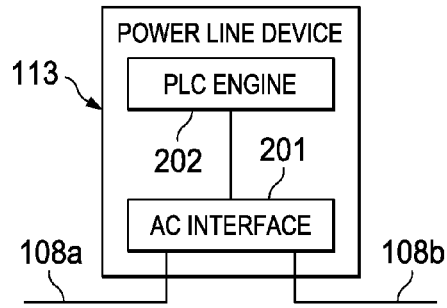

FIG. 2 is a block diagram of a PLC device or modem according to some embodiments.

Figure 3:
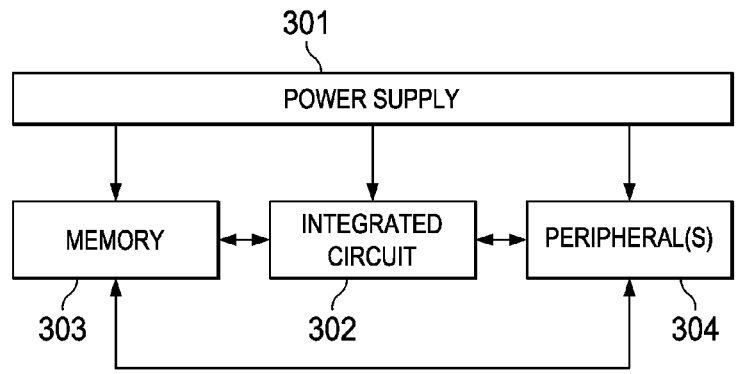

FIG. 3 is a block diagram of an integrated circuit according to some embodiments.

Figure 4:
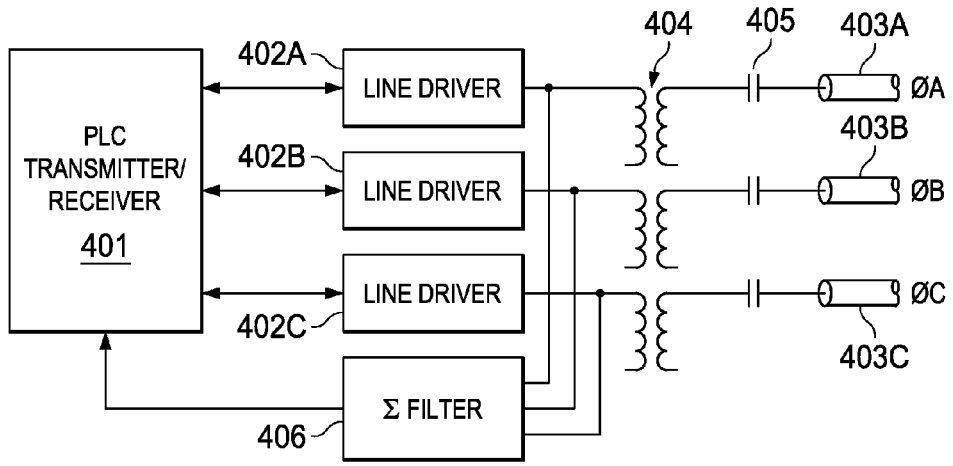
Figure 5:
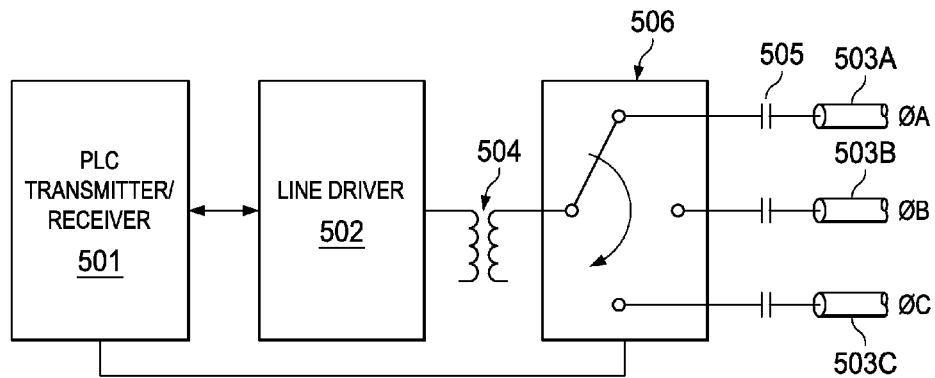
Figure 6:
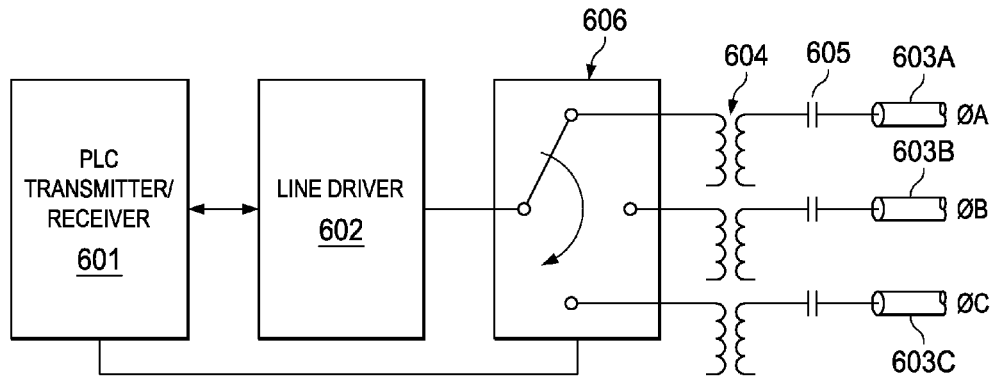

FIGS. 4-6 are block diagrams illustrating connections between a PLC transmitter and/or receiver circuitry to three-phase power lines according to some embodiments.

Figure 7:
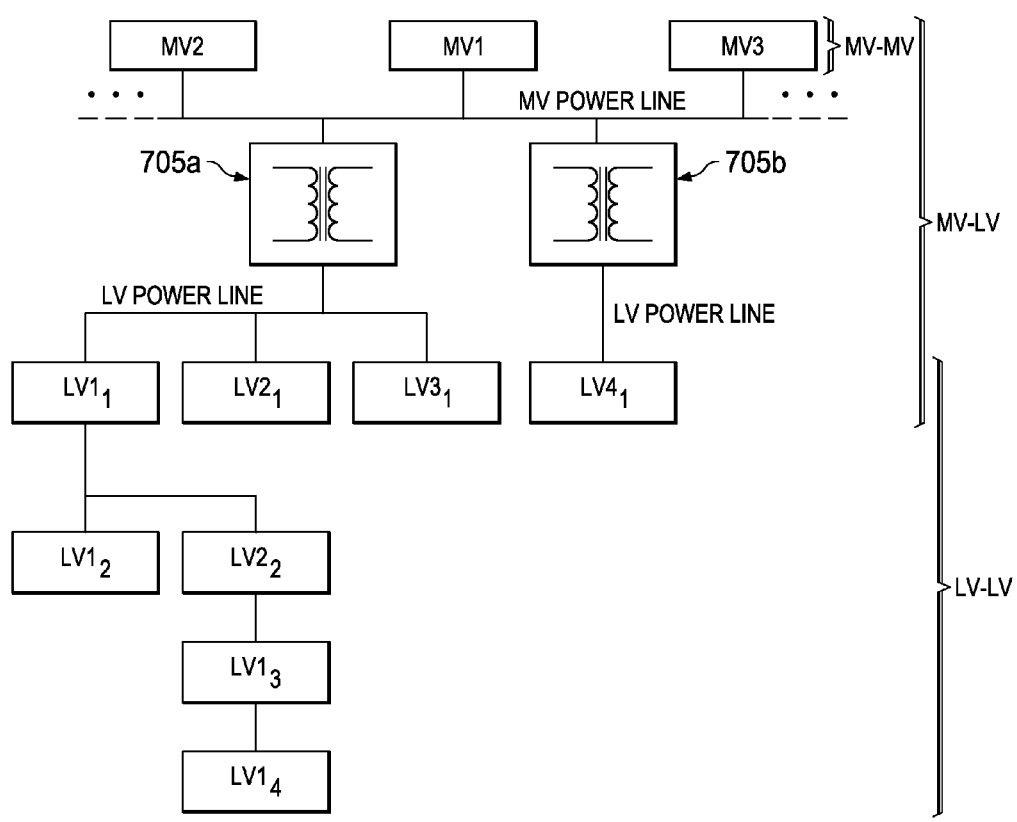

FIG. 7 is a block diagram of a hierarchical PLC communications network according to some embodiments.

FIG. 8 is a block diagram of a superframe suitable for PLC communications according to some embodiments.

Figure 9:
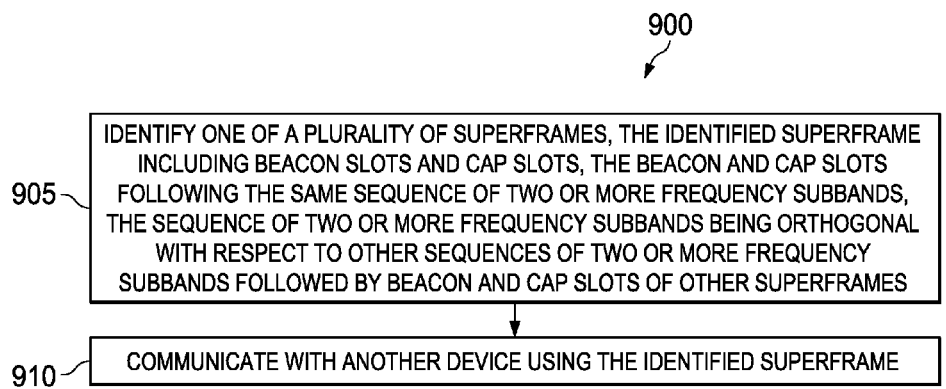

FIG. 9 is a flowchart of a method of operating MV devices using superframes that can coexist with other superframes used by other MV devices according to some embodiments.

Figure 10:
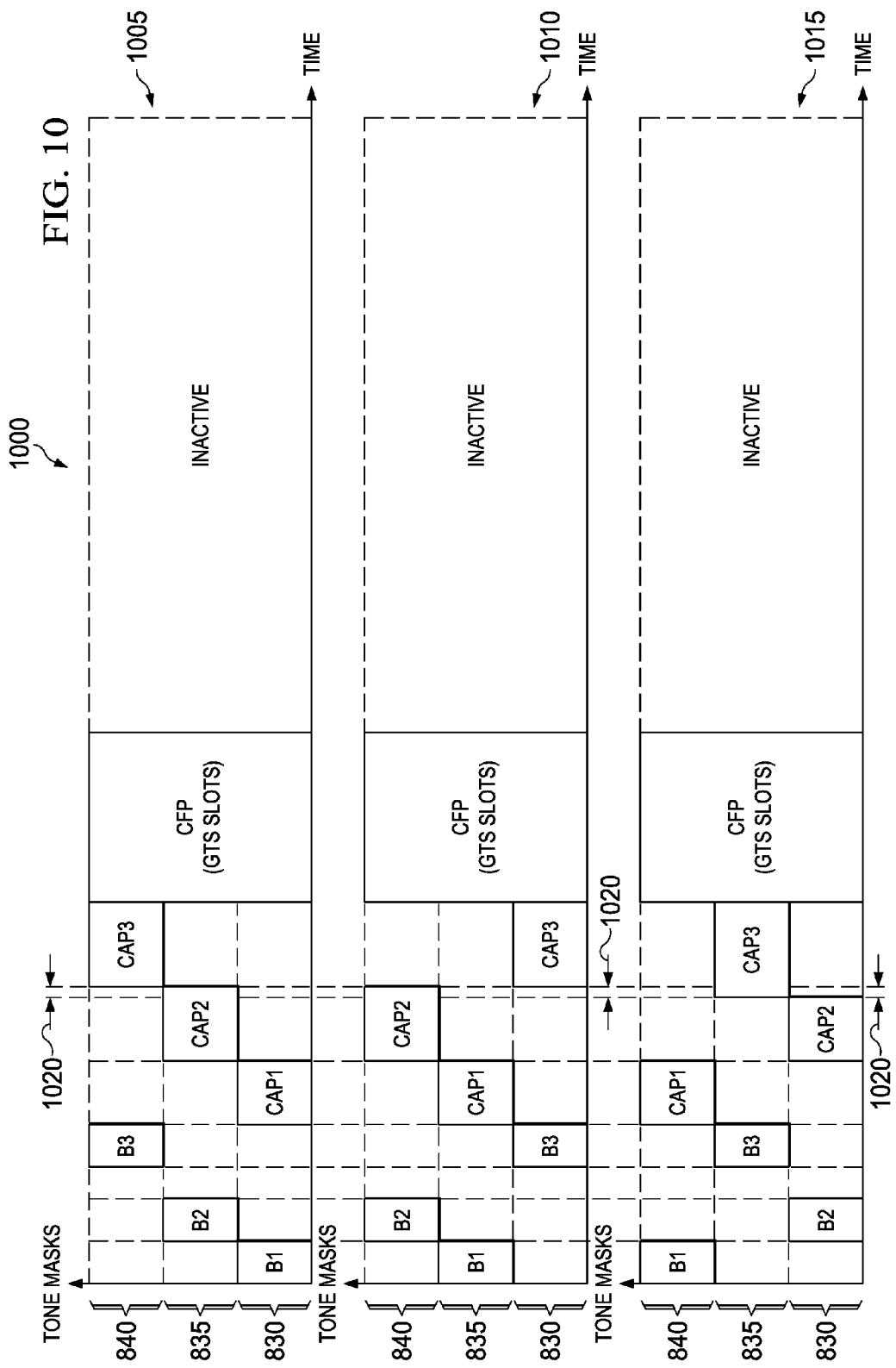

FIG. 10 is a diagram of a set of orthogonal superframes according to some embodiments.

Figure 11:
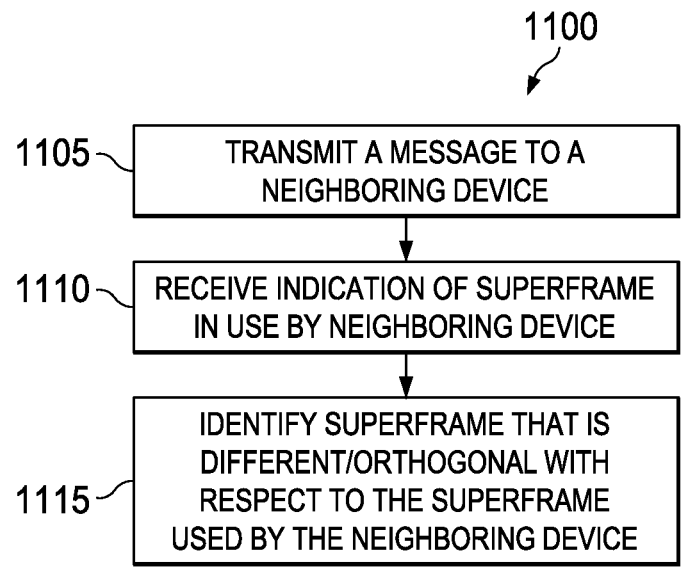

FIG. 11 is a flowchart of a method of superframe selection where each MV device operates as a coordinating device according to some embodiments.

Figure 12:
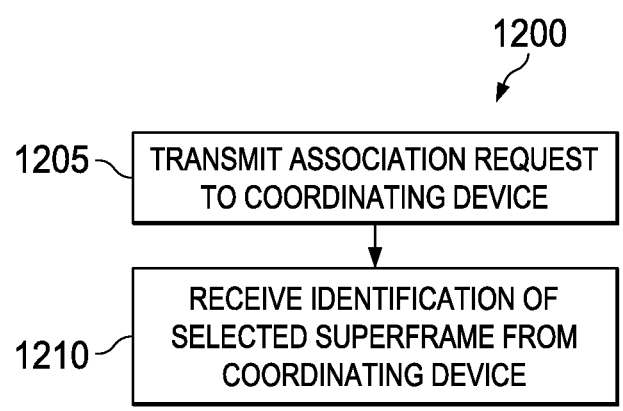

FIG. 12 is a flowchart of a method of superframe selection where fewer than all MV devices operate as a coordinating device according to some embodiments.

Figure 13:
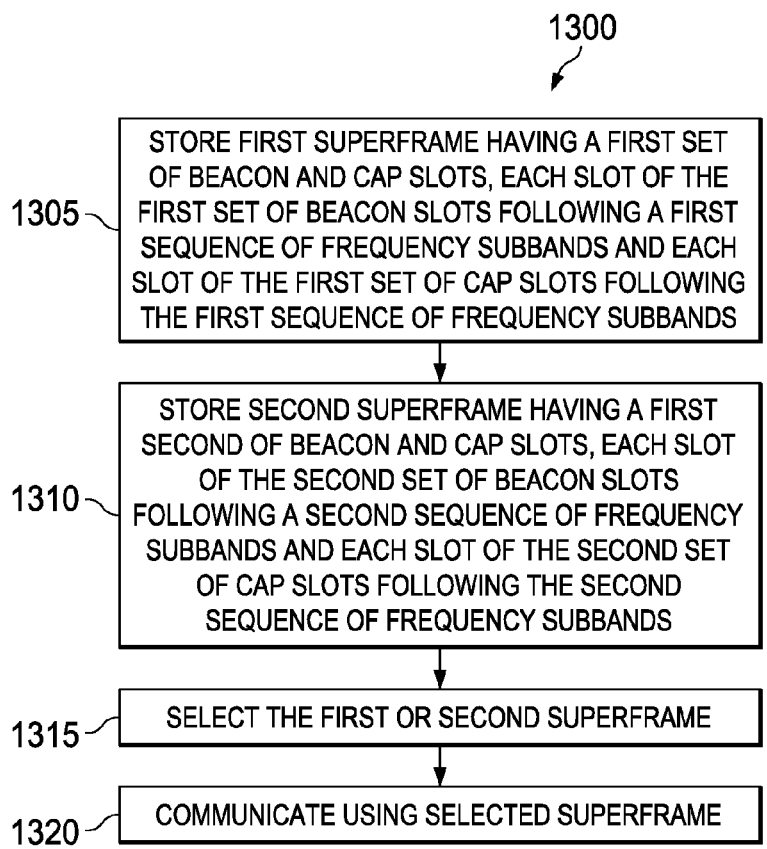

FIG. 13 is a flowchart of another superframe selection method according to some embodiments.

Figure 14:
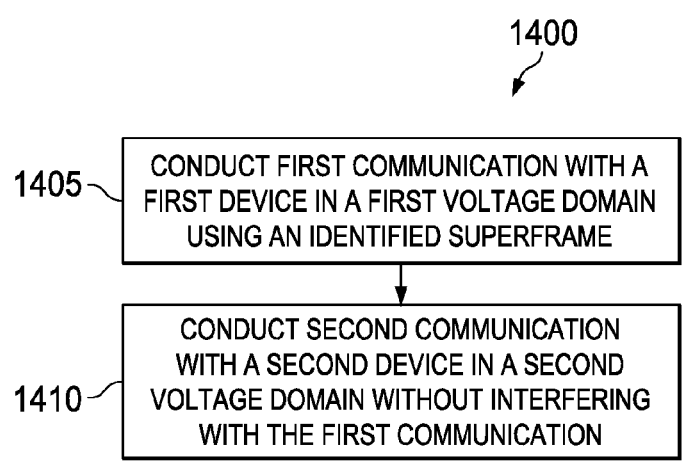

FIG. 14 is a flowchart of a method of operating first-level LV devices using superframes that can coexist with other superframes used by MV devices according to some embodiments.

FIG. 15 is a diagram of different superframes co-existing in different voltage domains separated in time according to some embodiments.

FIG. 16 is a diagram of different superframes co-existing in different voltage domains separated in frequency according to some embodiments.

FIG. 17 is yet another diagram of different superframes co-existing in different voltage domains according to some embodiments.

Figure 18:
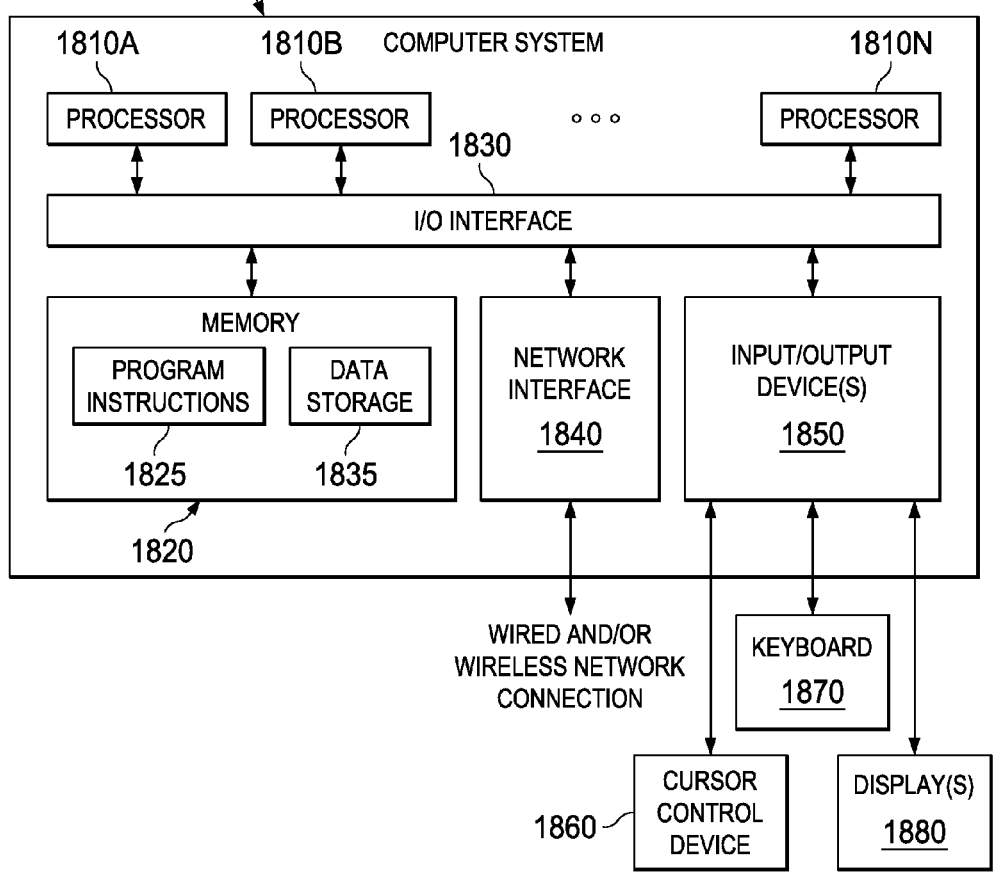

FIG. 18 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement communications in beacon-enabled networks. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Turning to FIG. 7 a block diagram of a hierarchical PLC communications network 700 is depicted. In the embodiment shown, medium-voltage (MV) devices or modems MV1, MV2, and MV3 (e.g., PLC data concentrators, routers, etc.) are coupled to each other and/or to an MV power line (e.g., 103 in FIG. 1). First-level low-voltage (LV) devices $LV1_1$, $LV2_1$, $LV3_1$, and $LV4_1$ (e.g., a PLC charger, a PLC meter, a PLC modem, etc.) are coupled to an LV power line (e.g., 105 in FIG. 1) through transformers 705a and 705b (e.g., 104 in FIG. 1). Second-level LV devices $LV1_2$ and $LV2_2$ are coupled to device $LV1_1$. Third-level device $LV1_3$ is coupled to device $LV2_2$, and fourth-level device $LV1_4$ is coupled to device $LV1_3$ (second-, third-, and fourth-level devices may be referred to as "lower-level" devices). It should be noted that network 700 is presented for sake of illustration only, and that in any given implementation may include an arbitrary number of MV and/or LV devices coupled in different ways under a different hierarchy. As illustrated, at least three different types of communication take place in network 700; namely, between MV devices (the "MV-MV network"), between MV devices and first-level LV devices (the "MV-LV network"), and among LV devices (the "LV-LV network").

Within network 700, communications may be achieved between or among devices using one or more different frequency subbands (also referred to as "tone masks" or "channels") in the downlink and uplink directions. Generally speaking, the term "downlink" refers to a communication in a direction that is received by a given device, and the term "uplink" refers to a communication in a direction that is transmitted by that same device. In the case of MV-LV communications, however, the term "downlink" refers to links or communications taking place from an MV device to an LV device, and the term "uplink" refers to links or communications taking place from an LV device to an MV device.

In a typical case, the frequency subband over which an MV device can communicate with an LV device (downlink) may be different from the subband that the LV device may used to communicate with an MV device (uplink). Also, the uplink and downlink subbands may be different between different LV devices communicating with the same MV device. As such, each PLC device involved in a communication may select (or allow another device to select) good or best communication channels or subbands, for example, based upon a determination of channel conditions (e.g., signal-to-noise ratio (SNR) measurements, congestion indicators, etc.) or the like.

In some embodiments, the PLC devices described above (and/or the computer system shown in FIG. 18) may be configured to implement one or more communication techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate inter-device communications according to one or more "superframe" structures. Such superframes may define the duration and/or relative times for transmission and/or receipt of different types of information by each device.

FIG. 8 is a block diagram of superframe 800 suitable for PLC communications according to some embodiments. As illustrated, superframe 800 includes beacon slots 810 (e.g., B1, B2, B3, etc.), followed by contention access period (CAP) slots 815 (e.g., CAP1, CAP2, CAP3, etc.), which are in turn followed by contention free period (CFP) or guaranteed time slots (GTS) 820, and then by inactive or idle period 825.

In various embodiments, superframe 800 may be particularly well suited for use by the MV devices (e.g., MV1, MV2, or MV3) shown in FIG. 7. In such cases, during beacon slots 810, an MV device may transmit one or more beacon packets (e.g., over slots B1, B2, B3, etc.) to one other MV devices and/or to one or more first-level LV devices $LV1_1$, $LV2_1$, $LV3_1$, and/or $LV4_1$ (i.e., in a downlink direction). Moreover, each beacon packet may include information that identifies the particular beacon slot over which it was sent and/or it may indicate the length, position, and/or duration of other elements (e.g., other beacon slots, CAP slots 815, GTS 820, and inactivity period 825) in superframe 800. Accordingly, once a listening first-level LV device receives a given beacon packet, for example, the structure and/or timing of superframe 800 may be readily acquired or derived by that device.

During CAP slots 815, superframe 800 may allow one or more of first-level LV devices $LV1_1$, $LV2_1$, $LV3_1$, and/or $LV4_1$ to transmit packets to an MV device (i.e., in the uplink direction) subject to contention or competition for the medium. During CFP 820, however, MV1 may allocate different time periods to specific ones of first-level PLC devices $LV1_1$, $LV2_1$, $LV3_1$, and/or $LV4_1$ for uplink and/or downlink communications (e.g., on-demand) without contention and/or risk of collision.

As illustrated, beacon slots 810 and CAP slots 815 in superframe 800 may be divided into tone masks or frequency subbands 830-840. Specifically, B1 and CAP1 occupy frequency subband 830, B2 and CAP2 occupy frequency subband 835, and B3 and CAP3 occupy frequency subband 840. Hence, each of beacon slots 810 and CAP slots 815 follow a same sequence of frequency subbands 830-840 (in this case, for example, the sequence would be "1-2-3"). Moreover, CFP slot 820 spans all three subbands 830-840 at the same time. It should be noted that, although only three tone masks or subbands are shown in this example, other implementations may include any arbitrary number of two or more frequency subbands. In some implementations, each of tone masks 830-840 may have an equal, predetermined spectral width. Additionally or alternatively, tone masks 830-840 may have different spectral widths. Similarly, in some implementations, each of CAP slots 815 may have an equal, predetermined duration or length. Additionally or alternatively, CAP slots 815 may have varying durations or lengths.

In this manner, first-level LV devices $LV1_1$, $LV2_1$, $LV3_1$, and/or $LV4_1$ intending to contend in a given channel may choose one of CAP slots 815 in which to transmit a packet to MV1, MV2, and/or MV4. Collision may still happen, for example, if two different nodes select the same one of CAP slots 815. However, if only one node chooses a particular one of CAP slots 815, then it may have its transmission free from collisions during the entire transmission time. These techniques may therefore be particularly useful to avoid or otherwise reduce "hidden node" problems, where one of first-level LV devices $LV1_1$, $LV2_1$, or $LV3_1$ cannot sense (e.g., via carrier sense multiple access (CSMA) or the like) an ongoing transmission by another first-level LV device $LV4_1$ because such a transmission is attenuated in the LV power line due to transformers 705*a-b*. If a first-level LV device (e.g., $LV1_1$) cannot sense $LV4_1$'s ongoing transmission and thus decides to initiate their own transmission, the two concurrent transmissions from the different sources $LV1_1$ and $LV4_1$ may collide in MV power line, and MV devices would not be able to receive either communication.

As noted above, each of MV devices MV1, MV2, or MV3 of FIG. 7 may employ a superframe such as superframe 800. Accordingly, in some embodiments, techniques may be provided to allow superframes to coexist among multiple MV devices and between MV devices and first-level LV devices. Referring back to FIG. 7, each of MV1, MV2 and MV3 may implement its own superframe in a manner such that they do not interfere with each other. Also, first-level LV devices $LV1_1$, $LV2_1$, $LV3_1$, and/or $LV4_1$ may follow each MV device's respective superframe when attempting to communicate with it. Thus, FIGS. 9-13 illustrate techniques suitable for selecting superframes for MV-MV (and MV-LV) communications that can coexist. When first-level LV device $LV1_1$ communicates with lower-level devices $LV1_2$, $LV2_2$, $LV1_3$, and/or $LV1_4$, device $LV1_1$ may use a different superframe (than the MV-MV or MV-LV superframe(s)), such that the LV-LV superframe can coexist with the MV-MV (and MV-LV) superframe(s). Accordingly, FIGS. 14-17 illustrate techniques suitable for selecting superframes for MV-LV communications that can coexist with MV-MV (and MV-LV) superframes.

FIG. 9 is a flowchart of a method of operating MV devices using superframes that can coexist with other superframes used by other MV devices. In some embodiments, method 900 may be performed, at least in part, by one or more MV devices (e.g., MV1, MV2, MV3, etc.) shown in FIG. 7. At block 905, method 900 may include identifying one of a set of available, orthogonal superframes (e.g., such as superframe 800 shown in FIG. 8). Each superframe within the set of orthogonal superframes may have its beacon and CAP slots following different subband sequences, such that these sequences may be orthogonal to each other at any given time, as shown in FIG. 10 below. Then, at block 910, method 900 may include communicating with another device using the identified superframe.

FIG. 10 is a diagram of a set of orthogonal superframes according to some embodiments, and which may be used in connection with method 900 of FIG. 9. In this example, a set of three orthogonal superframes 1005-1015 is depicted, although other implementations may use any number of two or more orthogonal superframes. Each of orthogonal superframes 1005-1015 includes beacon and CAP slots, as in superframe 800. Also, for a given superframe, each beacon and CAP slot follows a same sequence of frequency subbands. For example, in superframe 1005, beacon and CAP slots occupy frequency subbands 830, 835, and 840, in that order (i.e., "1-2-3"). In superframe 1010, beacon and CAP slots occupy frequency subbands 835, 840, and 830 in that order (i.e., "2-3-1"). Meanwhile, in superframe 1015, beacon and CAP slots occupy frequency subbands 840, 835, and 830 in that order (i.e., "3-1-2"). These sequences cause beacon slots in superframes 1005-1015 to be "orthogonal" with respect to each other. Similarly, CAP slots in superframes 1005-1015 are also "orthogonal." It should be noted that the length of the beacon slots and CAP slots (and in turn the overall lengths of superframes 1005-1015) need not be equal across superframes (or MV devices).

For example, at a first time, B1 in superframe 1005 occupies frequency subband 830, B1 in superframe 1010 occupies frequency subband 835, and B1 in superframe 1015 occupies frequency subband 840. Because these frequency subbands are non-overlapping, there is no interference or collision among the B1 slots during that time due to the orthogonality (in contrast, a superframe following a "1-2-3" subband sequence would not be orthogonal with respect to another superframe following a "1-3-2" sequence, for example, because in that case the first subband "1" would be used by two slots at the same time). The same may be said of the subsequent beacon and CAP slots. It should also be noted that, even when different superframes use a same tone mask or frequency subband for some portion of the time, the network may still operate without significant degradation in performance. For example, during time 1020, CAP2 of superframe 1005 operating over frequency subband 835 overlaps with CAP3 of superframe 1015 operating over the same subband 835.

In some embodiments, the number of orthogonal superframes may coincide with the number of immediately neighboring MV devices (e.g., MV1, MV2, and MV3 in FIG. 7). In other cases, however, the number of orthogonal superframes may be larger than the number of neighboring MV devices. It should be noted that, in a given communications network, non-neighboring MV devices may "reuse" superframes that may be employed by distant devices but not by immediately neighboring devices, such that interference and/or collision does not present a performance concern.

In some embodiments, selection or identification of a given one of a plurality of orthogonal superframes may be achieved by configuring each MV device as a personal area network (PAN) coordinating device. FIG. 11 is a flowchart of a method of superframe selection where each MV device operates as a coordinating device. In some implementations, one or more of the MV devices shown in FIG. 7 may perform method 1100. Specifically, at block 1105, method 1100 may include transmitting a message to a neighboring MV device (e.g., MV1 to MV2 via MV power line, as shown in FIG. 7). At block 1110, method 1100 may include receiving an indication of a superframe in use by the neighboring device (e.g., MV2 may send a message to MV1 indicating its superframe). For example, the indication may include a superframe identification number, code, and/or a frequency subband sequence for the superframe already in use by the neighboring device.

At block 1115, method 1100 may include identifying one of a plurality of available superframes that is different from (e.g., orthogonal to) the superframe already in use such that the sequence of frequency subbands followed by its beacon and CAP slots is orthogonal with respect to the sequence used by the neighboring device's superframe. In some implementations, a given MV device (e.g., MV1) may neighbor two or more other MV devices (e.g., MV2 and MV3). In those cases, the operation of blocks 1105 and 1110 may be repeated with respect to each of the other MV devices, and block 1115 may include selecting a superframe whose subband frequency is mutually orthogonal with respect to the other MV devices.

After the operations of method 1100, all MV devices may then be configured to employ a respective orthogonal superframe that does not cause collisions or otherwise interferes with the simultaneous or concurrent operation of their neighboring MV devices.

As an alternative to method 1100 of FIG. 11, FIG. 12 is a flowchart of method 1200 of superframe selection where fewer than all MV devices operate as a coordinating device. In some embodiments, one MV device (e.g., MV1) may act as a PAN coordinator, and neighboring devices may associate with the coordinator. At block 1205, a neighboring device (e.g., MV2) may use passive scanning to identify the PAN coordinator (e.g., MV1), and it may then transmit an association request or the like to the PAN coordinator. At block 1210, the PAN coordinator (e.g., MV1) may transmit a command frame or the like to the requesting device (e.g., MV2), which receives an indication of a selected superframe structure to be used in subsequent communications. In some embodiments, the superframe structure between a PAN coordinator (e.g., MV1) and its associated MV devices (e.g., MV2) may be aligned in time so that they operate in the same tone mask or frequency subband for at least one CAP slot, during which they may communicate with each other.

FIG. 13 is a flowchart of another superframe selection method. Similarly as in FIG. 11, here one or more of the MV devices shown in FIG. 7 may perform method 1300. At block 1305, method 1300 may include storing a first superframe structure having a first set of beacon and CAP slots, each slot following a first sequence of frequency subbands. At block 1310, method 1300 may include storing a second superframe structure having a second set of beacon and CAP slots, each slot following a second sequence of frequency subbands. Again, the first and second sequence of frequency subbands may be orthogonal with respect to each other. At block 1315, method 1300 may include selecting between the first and second orthogonal superframes, for example, upon interaction with one or more other MV devices as described in FIGS. 11 and 12. At block 1320, method 1300 may include communicating using the selected superframe.

In some embodiments, one or more operations depicted in FIGS. 11-13 may be performed at the time of network initialization. Additionally or alternatively, these operations may be performed at the introduction of a new MV device to an existing network. Additionally or alternatively, these operations may be performed periodically, at the occurrence of predetermined events (e.g., overall network performance falls below or otherwise meets a threshold value), and/or manually at the control of a human user.

As noted above, FIGS. 9-13 illustrate techniques that may be used to enable MV-MV communications (i.e., communications among MV devices (e.g., MV1, MV2, MV3, etc.)) as well as MV-LV communications (i.e., between MV devices and first-level LV devices (e.g., LV1$_1$, LV2$_1$, LV3$_1$, and/or LV4$_1$)) so that different, orthogonal superframes may co-exist. In addition, the systems and methods described herein also provide techniques that enable LV-LV communications, as further described below.

Again, in some embodiments, first-level LV devices (e.g., LV1$_1$, LV2$_1$, LV3$_1$, and/or LV4$_1$) may follow the same superframe structure of the MV device (e.g., MV1) that they are coupled to. As such, a given first-level LV device (e.g., LV1$_1$) may have its receiver tuned to an assigned or selected downlink frequency subband during its CAP slot (for immediate acknowledgement of messages transmitted in the uplink direction during the assigned or selected CAP slot) and also during the GTS period (i.e., for downlink transmissions from the MV device). Hence, during this time, the first-level LV device may not be able to receive any communication from other LV nodes (i.e., whether neighboring or lower-level LV devices) if the LV-LV communications take place over a frequency subband other than the frequencies used in the MV-LV communications. However, if the LV-LV communications use the same frequency subband used in the MV-LV communications, then the LV network may interface with transmission in the MV-LV network.

To address these and other concerns, FIG. 14 shows a flowchart of a method of operating first-level LV devices using superframes that can coexist with other superframes used by MV devices. In some embodiments, method 1400 may be performed, at least in part, by a first-level LV device (e.g., $LV1_1$, $LV2_1$, $LV3_1$, and/or $LV4_1$) shown in FIG. 7. At block 1405, method 1400 may include conducting a first communication with a first device in a first voltage domain (e.g., an MV device coupled to an MV power line) using a first superframe. At block 1410, method 1400 may include conducting a second communication with a second device in a second voltage domain (e.g., an LV device coupled to an LV power line) without interfering with the first communication. For example, the second communication may follow a second superframe that is different from the first superframe (e.g., offset in time, with different durations, etc.).

FIG. 15 is a diagram of different superframes co-existing in different voltage domains separated in time, according to some embodiments. Particularly, MV superframe 1505 may be employed by MV devices, as well as first-level LV devices when communicating with MV devices. Meanwhile, LV superframe 1510 may be used by first-level LV devices when communicating with other LV devices. In this case, LV-LV communications may take place during idle times in MV superframe 1505 (e.g., inactivity period 825 in FIG. 8), whereas MV-LV communications may take place during idle times in LV superframe 1510. Because the MV-LV and LV-LV superframes are active at different times (and therefore MV-LV and LV-LV communications take place during mutually exclusive times), the MV-LV and LV-LV networks do not interfere with each other (at the cost of reduced efficiency in both networks).

FIG. 16 is a diagram of different superframes co-existing in different voltage domains separated in frequency, according to some embodiments. In this case, both MV superframe 1605 and LV superframe 1610 are employed concurrently. Moreover, LV superframe 1610 is silent during beacon slots 810 and GTS slot 820 in MV superframe 1605, as well as during one or more of CAP slots 1615 selected for first-level LV device to communicate with the MV device in the uplink direction. In other words, LV superframe 1610 is active during the periods of MV superframe 1605 dedicated to CAP slots 1620, which are not in use by the first-level LV device (i.e., concurrently with one or more of superframe 1505's CAP slots 1620 other than the selected or assigned CAP slot 1615. Depending upon the desired implementation, LV superframe 1610 may include its own beacon slots, CAP slots, or GTS slots over a frequency band not in use by the first-level device (i.e., other than the frequency corresponding to CAP slot 1615). Also, the first-level LV device may be configured to inform other LV nodes in the LV-LV network (e.g., via the beacon slot(s) of LV superframe 1610) not to transmit messages during beacon slots 810, GTS slot 820 and the one or more CAP slots 1615.

Because the selected CAP slot 1615 may be in any frequency subband, and therefore may occur at time during the CAP period of MV superframe 1605, LV superframe 1610 may, in some cases, be split across different time periods. FIG. 17 illustrates an example of such a situation, where selected CAP slot 1715 divides the CAP portion of MV superframe 1405 into first area 1720a and second area 1720b. In this case, LV superframe 1710 may be split so that its active period coincides with areas 1720a and 1720b. As shown here, LV superframe has a beacon and CAP slot separated from a GTS slot by an idle period. In other implementations, however, LV superframe 1710 may be split in different ways depending upon its size, its number of beacon slots, its number of CAP slots, the length of its GTS, the length of portion 1720a, and/or the length of portion 1720b. Furthermore, if the first-level LV device selects or is assigned two distinct CAP slots, then LV superframe 1710 may be further subdivided in time.

In addition or as an alternative to the LV superframe structures shown in FIGS. 15-17, an LV-LV network may operate in non-beacon mode while being associated with an LV coordinator (i.e., a first-level LV device). In such implementations, the LV coordinator (i.e., the first-level LV device) may follow the MV superframe structure to communicate with an MV device, but may use CSMA or other suitable channel access technique to communicate with other LV devices in the LV-LV network. Similarly, lower-level LV devices may use CSMA to communicate amongst themselves.

As previously noted, in certain embodiments, systems and methods for designing, using, and/or implementing communications in beacon-enabled networks may be executed, at least in part, by one or more communication devices and/or computer systems. One such computer system is illustrated in FIG. 18. In various embodiments, system 1800 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1800 includes one or more processors 1810 coupled to a system memory 1820 via an input/output (I/O) interface 1830. Computer system 160 further includes a network interface 1840 coupled to I/O interface 1830, and one or more input/output devices 1825, such as cursor control device 1860, keyboard 1870, display(s) 1880, and/or mobile device 1890. In various embodiments, computer system 1800 may be a single-processor system including one processor 1810, or a multi-processor system including two or more processors 1810 (e.g., two, four, eight, or another suitable number). Processors 1810 may be any processor capable of executing program instructions. For example, in various embodiments, processors 1810 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1810 may commonly, but not necessarily, implement the same ISA. Also, in some embodiments, at least one processor 1810 may be a graphics processing unit (GPU) or other dedicated graphics-rendering device.

System memory 1820 may be configured to store program instructions and/or data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1820 as program instructions 1825 and data storage 1835, respectively. In other embodiments, program instructions and/or data may be received, sent or stored upon different types of computer-accessible media or on similar media separate from system memory 1820 or computer system 1800. Generally speaking, a computer-accessible medium may include any tangible storage media or memory media such as magnetic or optical media—e.g., disk or CD/DVD-ROM coupled to computer system 1800 via I/O interface 1830. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1840.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network, such as other computer systems, or between nodes of computer system 1800. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, mobile devices, or any other devices suitable for entering or retrieving data by one or more computer system 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1825, configured to implement certain embodiments described herein, and data storage 1835, comprising various data accessible by program instructions 1825. In an embodiment, program instructions 1825 may include software elements of embodiments illustrated in the above figures. For example, program instructions 1825 may be implemented in various embodiments using any desired programming language, scripting language, or combination of programming languages and/or scripting languages (e.g., C, C++, C#, JAVA®, JAVASCRIPT®, PERL®, etc.). Data storage 1835 may include data that may be used in these embodiments (e.g., recorded communications, profiles for different modes of operations, etc.). In other embodiments, other or different software elements and data may be included.

A person of ordinary skill in the art will appreciate that computer system 1800 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method for communicating in a beacon-enabled powerline communication network, said method comprising: performing, by a powerline communication (PLC) data concentrator coupled to a medium voltage (MV) power line, transmitting a message to another PLC data concentrator coupled to the MV power line; receiving, from the another PLC data concentrator, a response to the transmission, the response including an identification of a superframe in use by the another PLC data concentrator; identifying one of a plurality of orthogonal superframes that is different from the superframe in use by the another PLC data concentrator, the identified superframe including beacon slots and contention access period (CAP) slots, the beacon slots following a sequence of two or more frequency subbands and the CAP slots following the same sequence of two or more frequency subbands, the sequence of two or more frequency subbands being distinct from other sequences of two or more frequency subbands followed by other beacon slots and CAP slots within others of the plurality of orthogonal superframes; and communicating with the another PLC data concentrator using the identified superframe, wherein the orthogonality of frequencies transmitted concurrently by different coordinators at the same time to enable parallel communications.

2. The method of claim 1, wherein the beacon slots precede the CAP slots in time within the identified superframe.

3. The method of claim 2, wherein the identified superframe further includes a contention free period (CFP) slot, the CFP slot occupying all subbands of the sequence of two or more frequency subbands, the CAP slots preceding the CFP slot in time within the identified superframe.

4. The method of claim 3, wherein the identified superframe further includes an inactivity period, the CFP slot preceding the inactivity period in time.

5. The method of claim 1, wherein a portion of a given one of the CAP slots in the identified superframe partially overlaps in time with another CAP slot of another one of the plurality of orthogonal superframes.

6. The method of claim 1, wherein identifying the one of the plurality of orthogonal superframes includes: performing, by the PLC communication data concentrator, transmitting an association request to a coordinating device; and receiving, from the coordinating device, a response to the transmission, the response including an identification of a selected one of the plurality of orthogonal superframes.

7. The method of claim 6, wherein at least one of the CAP slots of the selected superframe uses a same frequency subband as a CAP slot of a different superframe used by the coordinating device at the same time.

8. A method for communicating in a beacon-enabled powerline communication network, said method comprising: performing, by a powerline communication (PLC) data concentrator coupled to a medium-voltage (MV) power line, the MV power line coupled to the LV power line via a transformer; transmitting a message to another PLC data concentrator coupled to the MV power line; receiving, from the another PLC data concentrator, a response to the transmission, the response including an identification of a superframe in use by the another PLC data concentrator; identifying one of a plurality of orthogonal superframes that is different from the superframe in use by the another PLC data concentrator, the identified superframe including beacon slots and contention access period (CAP) slots, the beacon slots following a sequence of two or more frequency subbands and the CAP slots following the same sequence of two or more frequency subbands, the sequence of two or more frequency subbands being distinct from other sequences of two or more frequency subbands followed by other beacon slots and CAP slots within others of the plurality of orthogonal superframes; and communicating with the another PLC data concentrator using the identified superframe, wherein the orthogonality of frequencies transmitted concurrently by different coordinators at the same time to enable parallel communications.

9. A system, comprising: a power line communication (PLC) data concentrator coupled to a low-voltage (LV) power line, the LV power line coupled to a medium-voltage (MV) power line through a transformer, the PLC device comprising: a processor; and a memory coupled to the processor, the memory configured to store program instructions executable by the processor to cause the PLC data concentrator to: transmitting a message to another PLC data concentrator coupled to the MV power line; receiving, from the another PLC data concentrator, a response to the transmission, the response including an identification of a superframe in use by the another PLC data concentrator identify one of a plurality of orthogonal superframes that is different from the superframe in use by the another PLC data concentrator, the identified superframe including beacon slots and contention access period (CAP) slots, the beacon slots following a sequence of two or more frequency subbands and the CAP slots following the same sequence of two or more frequency subbands, the sequence of two or more frequency subbands being distinct from other sequences of two or more frequency subbands followed by other beacon slots and CAP slots within others of the plurality of orthogonal superframes; and communicate with the another PLC data concentrator using the identified superframe, wherein the orthogonality of frequencies transmitted concurrently by different coordinators at the same time to enable parallel communications.

10. The system of claim 9, wherein the processor includes a digital signal processor (DSP), an application specific integrated circuit (ASIC), a system-on-chip (SoC) circuit, a field-programmable gate array (FPGA), a microprocessor, or a microcontroller.

* * * * *